May 31, 1938. H. D. STECHER 2,119,448
FITTING
Filed Dec. 23, 1935
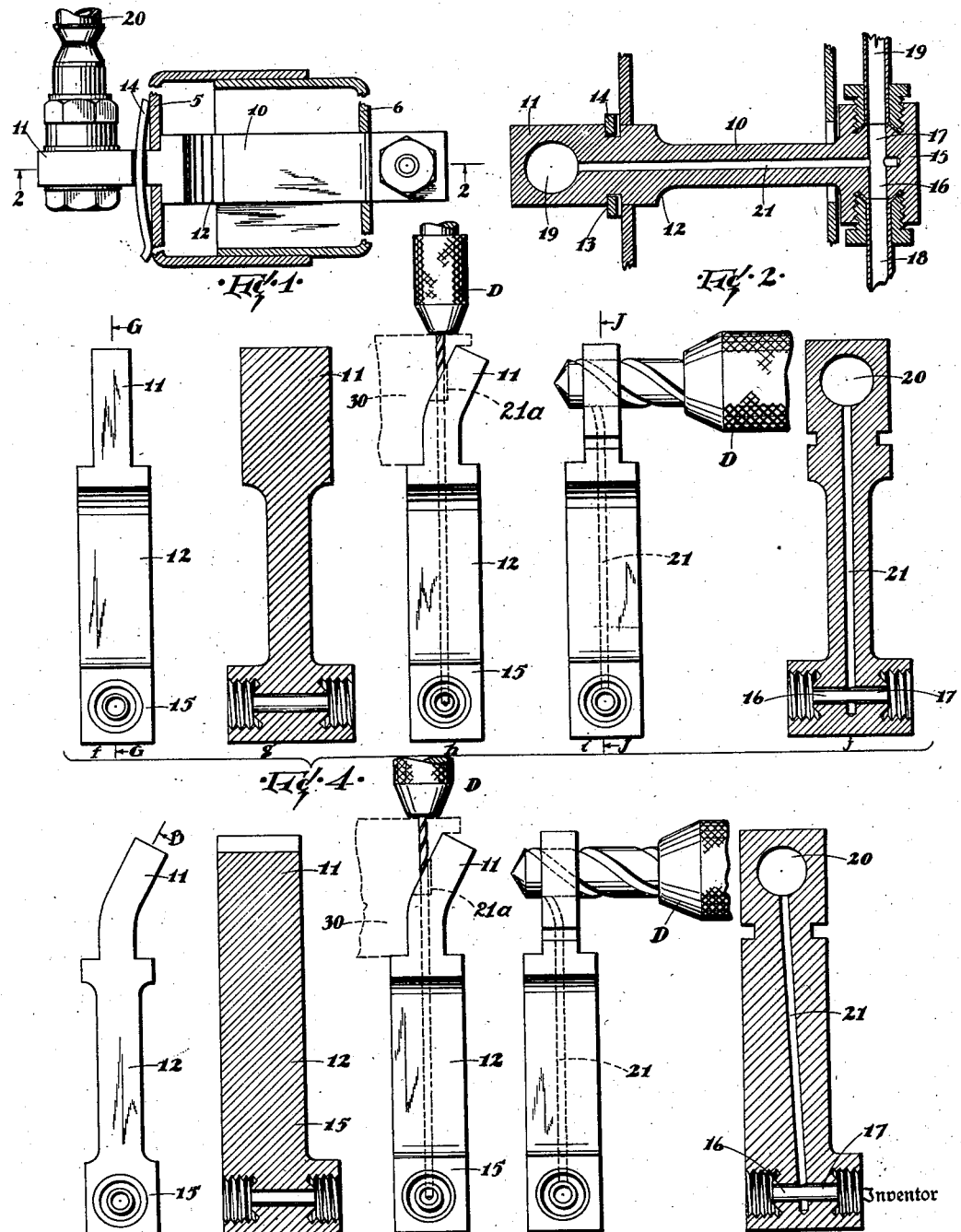

Patented May 31, 1938

2,119,448

UNITED STATES PATENT OFFICE 2,119,448

FITTING

Henry D. Stecher, Cleveland, Ohio, assignor to
The Weatherhead Company, Cleveland, Ohio, a
corporation of Ohio Application December 23, 1935, Serial No. 55,701

3 Claims. (Cl. 285—207)

This invention relates to fittings and methods of making fittings adapted for example for use in hydraulic brake systems and more particularly relates to fittings adapted to conduct the brake actuating fluid through a member of the frame to the automobile and at the same time to form a connection between a metallic tube and a flexible non-metallic hose.

For the purpose of illustrating and describing my invention I will refer to it in the environment of a hydraulic brake system but I expect those skilled in the art to appreciate that the method of making the fitting or the fitting itself may well be suited to other uses.

In hydraulic brake systems for automobiles it is customary to conduct the actuating fluid to various points on the frame adjacent the wheels by means of copper or steel tubes and to make the connection to the brake operating cylinders carried by the wheels through flexible rubber hoses. In order to protect the copper tubes as much as possible, it is desirable to run the tubes inside of the automobile frame. This requires the provision of apertures in the frame and supporting brackets for the tubes or the provision of fittings extending through the frame apertures, which function both as supports and as conduits for the brake actuating fluid.

Recent improvements in the frame structure of automobiles involve the provision of K, Y or X-shaped structures between the conventional longitudinal frame members and when these supplemental frame parts are fastened to the longitudinal frame member they close the open channel of said member heretofore employed to carry the brake fluid conduits. A fitting long enough to extend through the web of a single frame could be employed in the old frame, but the new frame structures require a fitting having a long shank to extend through a box section frame. It has heretofore been necessary to form the bore through such relatively long shanks by drilling through an end face of the fitting and soldering a plug in the end of the bore. This produces a shank having the desired shape, but the soldered plugs have been known to develop leaks, while the plugging and soldering operations involve considerable expense and frequently result in obstructing one of the passageways through the fitting.

It is among the objects of my present invention to provide a one piece fitting having passageways in the opposite ends thereof lying in substantially parallel planes and having a relatively long interconnecting passageway extending therebetween and having the walls surrounding the parallel passageways solid and formed without any plugging or soldering or similar operations. Another object of my invention is the provision of a method for making such a fitting. Another object is the provision of a one piece fitting adapted to extend through the spaced parallel webs of an automobile frame and having means at each end thereof for connection to conduits parallel to the frame. Another object of my invention is to provide a fitting of the character noted above which can be manufactured economically, preferably from bar stock. A further object is the provision of a method of making such fittings from bar stock. Another object of my invention is the provision of a method of forming interconnecting passageways extending in parallel planes without drilling through the external walls surrounding the parallel passageways.

Further objects and advantages of my invention will appear from the following description of preferred embodiments thereof, reference being made to the accompanying drawing in which Figure 1 illustrates my fitting as mounted in an automobile frame, the frame being shown in section; Figure 2 is a sectional view as indicated by line 2—2 of Figure 1; Figure 3 illustrates the steps of a preferred method of making my fittings; and Figure 4 illustrates the steps of an alternative method of making my fittings.

Referring to the drawing, the main longitudinal frame member 5 of the automobile presents a U-shaped cross section which receives the side wall portions of a similarly shaped supplementary frame member 6. The telescoping portions of the frame are secured to each other in the overlapping side wall portions by riveting, welding or other suitable means and are apertured to receive the shank portion of the fitting identified generally as 10. The shank receiving aperture of the main frame member 5 is shaped and proportioned to fit the outer extremity 11 of the shank. The extremity 11 of the fitting is preferably formed with notches 13 to receive fastening devices such as the arched resilient clip 14 which urges the shouldered portion of the main body of the shank 12 into engagement with the inner wall of the frame member 5. The shank portion may be proportioned with respect to the effective thickness of the combined frame members to position the base portions 15 of the fitting against the wall of the supplementary frame member 6 when the resilient clip is inserted. The clip is preferably made according to disclosure of the Baldwin Patent No. 1,875,209, of August 30, 1932.

The base portion 15 of the fitting may be provided with oppositely extending co-axial bores 16 and 17 threaded to receive fluid conduits 18 and 19 respectively. The outer end of the shank 11 is apertured as at 19 to receive the connector of a flexible hose 20 which leads to a wheel cylinder of a hydraulic brake assembly not shown. The conduits 18 and 19 may lead to the master cylinder of the brake system and to another fitting respectively. To conduct the actuating fluid from the base 15 to the hose 20 a bore 21 is formed longitudinally of the shank. The above mentioned defects of prior types of fittings were largely due to the formation of this bore and my invention is directed particularly to elimination of these defects and the provision of a novel method of forming this bore.

To form the fitting 10, a length is cut from bar stock preferably produced by an extrusion process and the cross section shown in $a$ of Figure 3 with the upper portion 11 curved with respect to the body or shank portion 12. The cut off blank is machined to the shape shown at $b$ which represents a section taken on line B—B of showing $a$. The outer end 11 of the shank is thus initially extruded as bent with respect to the body of the fitting to present the form shown in $a$ and $c$. With a fitting proportioned as shown in the drawing I have found a bend of about 30 degrees to be satisfactory, though it will be evident as the description proceeds that the amount of bend required to carry out the method is dependent upon a number of variable factors such as the length of shank, the diameter of the bore and the thickness of the shank.

The fitting blank with the bent end 11 is preferably placed against a suitable jig 30 as illustrated in $c$ and drilled longitudinally of the shank. To facilitate the drilling operation the curved face of part 11 may be provided with a preliminary counterbore or milled recess 21a to assist in starting the drilling operation. Subsequent to the longitudinal drilling operation the portion 11 is bent into axial alignment with the body of the blank and is drilled at right angles to the shank as in $d$ to provide the aperture 20 as illustrated in $e$. The fitting as straightened and drilled is shown in cross section in $e$ which is a view on line E—E of $d$ with the drill removed. As will be observed in this view the longitudinal bore 21 terminates intermediate the end faces of the shank and the strength and durability of the fitting is not adversely affected by plugs or similar devices applied to these parts. Those skilled in the art will appreciate that this method of forming the longitudinal bore by drilling into a blank formed with a bend may be advantageously combined with the angular method of drilling disclosed in Patent No. 2,017,812, issued October 15, 1935 to Charles H. Crawley.

As an alternative method of forming the fitting 10, the blank may be cut from extruded bar stock and milled or otherwise worked to present the shape shown in $f$ and $g$ of Figure 4. The outer end 11 of the blank is then bent with respect to the body of the fitting to present a shape as shown in $h$. The bent blank as shown in $h$ is inserted in a jig 30 and drilled, and then it is straightened as heretofore described in connection with the method illustrated in Figure 3. The completed fitting is shown in cross section at $j$ taken on the line J—H of $i$.

From the foregoing description of preferred forms of my invention it will be understood that the methods are well suited to the production of other forms of fittings and to other devices where it is desired to provide a longitudinal bore intermediate the end faces with no openings in the end faces in axial alignment with the bore. My methods can be carried out economically and rapidly, and my fittings, because of their one piece construction and freedom from plugs and solder, are reliable and leakproof and free from the defects of prior types of fittings.

It will be obvious to those skilled in the art that various changes and modifications can be made in my invention without departing from the spirit thereof. The present specification discloses only preferred forms of my invention and it is to be understood that the scope of my patent is not limited by the description contained herein or in any manner other than by the appended claims, when given the range of equivalents to which they may be entitled.

I claim:

1. A fitting having end portions and an elongated intermediate shank portion, openings in said end portions extending substantially transversely of the axis of said shank portion, an interconnecting passageway extending between said openings, the axis of said passageway being straight throughout the major portion of its length and being curved or bent adjacent the remainder thereof.

2. A fitting having end portions and an elongated intermediate shank portion, openings extending substantially transversely of the axis of said shank portion, the external walls of the fitting co-incident with the axis of the shank portion being solid and free of plugs or welds, an interconnecting drilled passageway of less length than the length of the fitting extending between said openings, said passageway being substantially straight throughout the major portion thereof and having the axis of said straight portion substantially co-incident with the axis of said shank.

3. A fitting having end portions and an intermediate shank portion, openings in said end portions extending substantially transversely of the axis of said shank portion, a passageway formed longitudinally of said shank portion and connecting said openings formed by providing a shank having one end thereof bent with respect to the main body thereof and drilling a straight bore longitudinally of the body and thereafter returning said bent end portion into alignment with the shank body.

HENRY D. STECHER.